United States Patent [19]

Marx

[11] Patent Number: 4,867,199
[45] Date of Patent: Sep. 19, 1989

[54] BI-PETAL CHECK-VALVE CONSTRUCTION

[75] Inventor: Howard B. Marx, Chagrin Falls, Ohio

[73] Assignee: Imo Industries, Inc., Princeton, N.J.

[21] Appl. No.: 284,097

[22] Filed: Dec. 14, 1988

[51] Int. Cl.4 ............................................. F16K 15/03
[52] U.S. Cl. .................. 137/512.1; 137/514; 137/904
[58] Field of Search ...................... 137/512.1, 904, 514

[56] References Cited

U.S. PATENT DOCUMENTS

| | | | |
|---|---|---|---|
| 2,877,792 | 3/1959 | Tybus | 137/512.1 |
| 4,230,148 | 10/1980 | Ogle | 137/512.1 |
| 4,249,567 | 2/1981 | Weiss | 137/512.1 X |
| 4,257,444 | 3/1981 | Ogle | 137/512.1 X |
| 4,351,358 | 9/1982 | Ogle | 137/512.1 |

*Primary Examiner*—Robert G. Nilson
*Attorney, Agent, or Firm*—Hopgood, Calimafde, Kalil, Blaustein & Judlowe

[57] ABSTRACT

A stiffly compliant upstop extends parallel to the hinge axis of a bi-petal check valve and provides essentially a continuous line of contact with the downstream side of each valve member. This line of contact is symmetrically located to span virtually the entire distance between the spaced hinge-suspension points unique to each valve member. And continuity of the respective lines of upstop contact is maintained throughout a terminal range of angular displacement, as the upstop compliantly deforms in approach to the full-open condition of the respective valve members.

6 Claims, 1 Drawing Sheet

BI-PETAL CHECK-VALVE CONSTRUCTION

BACKGROUND OF THE INVENTION

This invention relates to a body construction for a check valve or the like for carrying a fluid or fluid flow and in particular to up-stop structure for the respective members of a bi-petal check valve wherein strong unidirectional surges of fluid flow must be accommodated.

A check valve of the character indicated provides a seat post which extends diametrically across the section of flow accommodation in a pipe or conduit, thus dividing the flow and providing two like opposed generally semi-circular seat openings to share the fluid flow. And separate valve members are hinged back-to-back on a common axis parallel to and at downstream offset from the seat post, with provision for resiliently loading the valve members to their normal seated position of closing the respective seat openings. Sudden surges of fluid flow in the downstream direction open the valve with such force that the valve members can have mutually destructive impact unless measures are taken for avoiding member-to-member contact upon valve opening. And the prior art includes various such measures, including independent valve-body upstop referencing for each of the valve members (U.S. Pat. No. 4,230,148), and torsion-spring retarders for the valve members as they approach full-open position (U.S. Pat. Nos. 4,351,358 and 4,249,567).

All of the up-stop or retarding structures of which I am aware exhibit various deficiencies, not the least of which is that their retarding or impact-resisting force is relatively local, in application to the respective valve members. One may generalize by observing that the prior-art structures have relied upon essentially point contact with the opening valve members, with the result that the momentum of opening valve members must be asymmetrically absorbed, with ultimately destructive effect upon the valve members and/or their hinging and upstop structures.

BRIEF STATEMENT OF THE INVENTION

It is the object of this invention to provide improved upstop structure in a bi-petal check valve whereby valve-member impact at and near the full-open position can be compliantly absorbed with substantially complete symmetry and uniformity over an extensive area, with respect to the hinge suspension.

The invention meets this object by providing a stiffly compliant member which extends parallel to the hinge axis and which provides essentially a continuous line of contact with the downstream side of each valve member. This line of contact is symmetrically located to span virtually the entire distance between the spaced hinge-suspension points unique to each valve member. And continuity of the respective lines of upstop contact is maintained throughout a terminal range of angular displacement, as the upstop compliantly deforms in approach to the full-open condition of the respective valve members.

DETAILED DESCRIPTION

The invention will be described in detail for a preferred embodiment and in connection with the accompanying drawings, in which.

Figure 1:
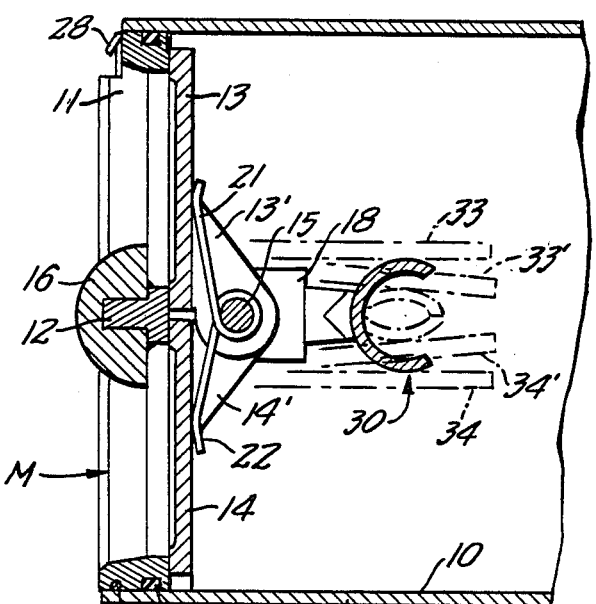
FIG. 1 is a vertical sectional view of a bi-petal check valve incorporating the upstop feature of the invention.
Figure 2:
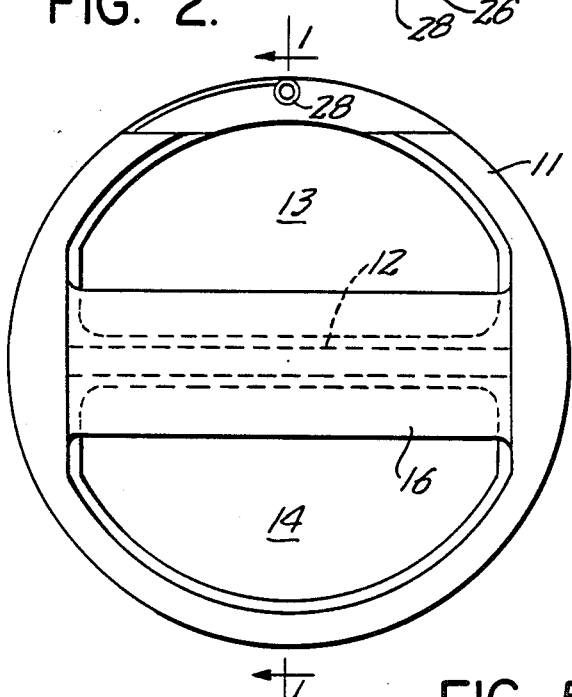
FIG. 2 is a front elevation of the valve of FIG. 1, namely, looking downstream in the direction of fluid-flow accommodation, and indicating at 1-1 the section plane of FIG. 1.

The check valve in which upstop structure of the invention is embodied in FIG. 1 is of the modular nature shown and described in U.S. Pat. No. 4,257,444. Thus, a check-valve module M is bodily insertable into one end of the cylindrical bore 10 of a standard pipe or conduit P, to determine one-way flow in the left-to-right direction of FIG. 1. The check-valve module comprises a relatively thin cylindrical body annulus 11 which has a cylindrical outer surface designed for relatively close but slip-fit reception in the bore 10. The inner-surface contour of the body annulus 11 is smoothly convergent to a valve-seat plane at the downstream end, and a diametrically extending seat post 12, integrally formed with the body annulus, extends diametrically across the annulus at the seat plane, dividing the body opening into two like opposed generally semicircular valve-seat openings A-B (FIG. 2). Two like valve members or petals 13-14 have offsetting arms 13'-14' by which they are independently hinged from a single hinge pin 15 which extends diametrically, at a location downwardly offset from the valve-seat plane and parallel to the seat post 12. A semi-cylindrically rounded flow deflector 16 is carried by the seat post, and its diameter substantially conforms to the span between valve members 13-14 when driven to open position.

Figure 3:
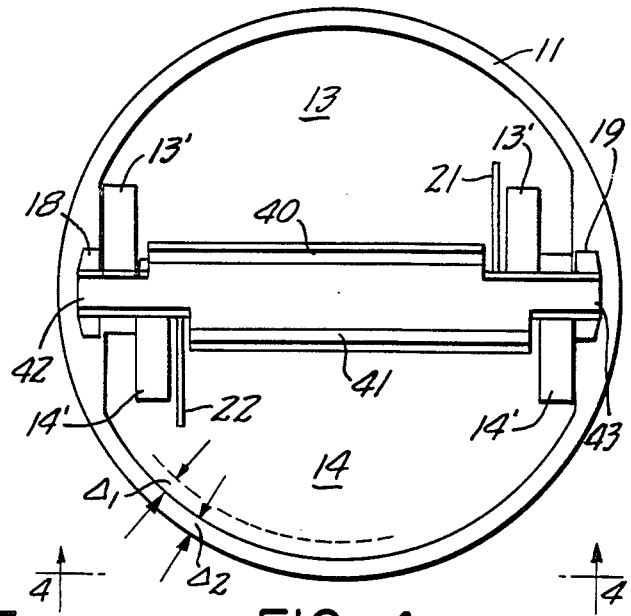
FIG. 3 is a rear elevation of the valve of FIG. 1.

Seated valve-member overlap of body 11-12 at the seating plane is peripherally continuous about each of the openings defined by the seat post 12, to the extent designated $\Delta_1$ in FIG. 3, thus leaving a radial clearance $\Delta_2$ between each petal 13 (14) and the adjacent cylindrical periphery of the valve body 11. At the diametrically opposite regions of seat-post juncture with body 11, the clearance $\Delta_2$ is slightly enlarged, for greater structural integrity and to integrally accommodate local downstream mounts 18-19 for the respective ends of hinge pin 15. A single coil spring 20 wrapped around pin 15 is characterized by tangent end arms 21-21' by which it applies bias torque to urge valve members 13-14 to the closed position shown. To secure and seal the indicated slip-fit to bore 10, the external surface of body 11 has a circumferential seal groove 23 near the valve-seating plane, and a retainer groove 24 more near the upstream end of body 11. An elastomeric O-ring 26 in groove 23 has circumferentially sealing engagement to the bore 10, and a retaining wire 28 is circumferentially accommodated by and between groove 24 and an undercut complementary groove in the bore 10, for axial retention of the slip-fitted module M in pipe P. Reference is made to said U.S. Pat. No. 4,257,444 for further detail of the retaining wire 28 and its removable reception by grooves 23-24.

In accordance with the invention, a stiffly compliant upstop 30 is supported by mounts 18-19 for independent and substantially continuous line contact with the respective valve members 13-14 as they near their respective full-open positions; their relationship at first contact with upstop 30 is shown by phantom lines 33-34 in FIG.

Figure 6:
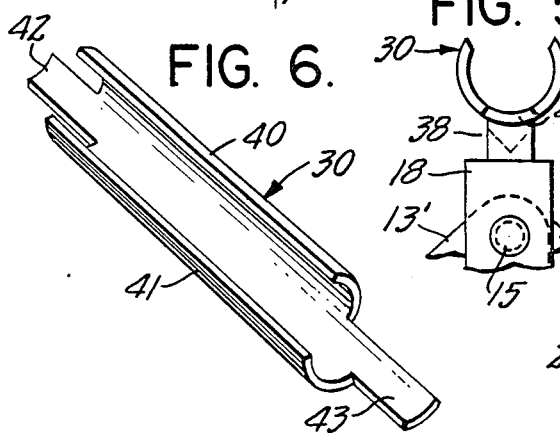
FIG. 6 is a perspective view of the upstop element of the valve of FIG. 1.
Figures 4, 5:
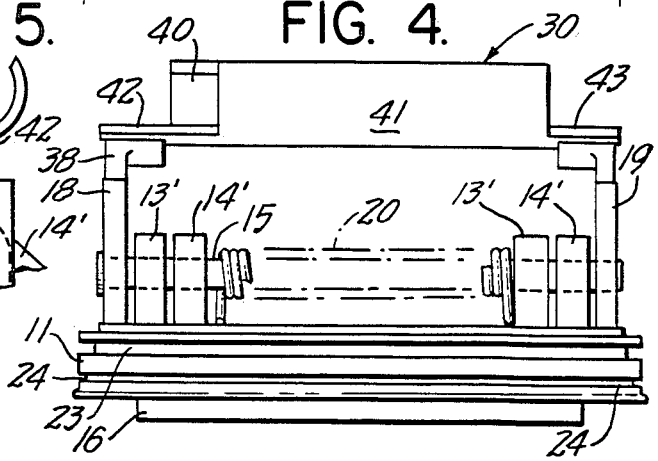
FIG. 4 is a side elevation, taken from the aspect designated 4—4 in FIG. 3.
FIG. 5 is a fragmentary left-end elevation of upstop-mounting structure of FIG. 4.

1, and by phantom lines 33'-34' when compliant deformation of the upstop reaches an end. As best seen in FIGS. 4, 5 and 6, upstop 30 comprises an elongate cylindrical arc of spring steel, with narrow end projections 36-37 which are in welded seating relation to the conforming cylindrically arcuate concavity of an upstop mount 38 (39), which is in turn secured to and therefore forms part of the respective hinge mounts 18 (19). For engagement with the flat back side of valve member 13, the upstop 30 integrally comprises an arcuate wing 40 which in FIG. 3 is seen to substantially correspond to, and to be symmetrically positioned between, the hinge arms 13' of valve member 13; and for engagement with the flat back side of valve member 14, upstop 30 further integrally comprises an arcuate wing 41 which in FIG. 3 is seen to substantially correspond to, and to be symmetrically positioned between, the hinge arms 14' of valve member 14.

The upstop 30 is conveniently made from tubular stock from which approximately $\pi/2$ radians of cylindrical arc have been removed, for the respective indicated lengths of wings 40-41, thereby leaving approximately $(3\pi)/2$ radians as the combined cylindrically arcuate extent of wings 40-41. At the outer end of each wing, the remaining length of the upstop is reduced to define a narrow, axially projecting arcuate tab 42 (43), by which to secure and support the upstop via mounting means 18-38 (19-39).

It will be seen that each wing 40 (41) engages its associated valve member 13 (14) along a straight line of contact at substantial downstream offset from and parallel to hinge pin 15, and that the open aspect of the upstop faces downstream. The angular momentum and flow-driven energy of a rapidly opening valve-member motion is absorbed by stiffly compliant deformation of the wings 40-41, to a limiting extent denoted by phantom outlines 33'-34', at which point the outer ends of wings 40-41 abut, and the compliantly deformed section 30' of upstop 30 resembles an ellipse. The stiff compliance assures stout progressively increasing force development as valve members may advance from the initial-contact positions 33-34 to their limiting positions 33'-34', and this force development is not only well distributed along straight lines of contact with the respective valve members 13-14, but is also symmetrically applied over virtually the entire span between the pair of hinge arms 13' (14') for the respective valve members. This relationship is achieved without increase in the flow-accommodating envelope of the check valve.

What is claimed is:

1. A check valve comprising a cylindrically annular body which includes a diametrically extending seat post dividing the opening of said body into two like opposed generally semicircular valve-seat openings to share fluid flow in a single downstream direction through said body, and two valve members having hinge suspension from said body to open and close said valve-seat openings, said valve members being hinged on a common axis parallel to and at downstream offset from said seat post, diametrically opposed mount structures for said hinge suspension and forming parts of said body, said mount structures extending at downstream offset-beyond the axis of hinge suspension, and a diametrically extending upstop mounted to and extending between the downstream offsets of said mount structures, said upstop comprising a single cylindrically arcuate member of stiffly compliant tempered steel wherein the cylindrical arc is in the order of $3\pi/2$ radians, leaving a stiffly compliantly closable gap of approximately $\pi/2$ radians between cylindrically arcuate limits, said upstop being supported by said mount structures essentially only in a circumferentially central region between said arcuate limits and with said gap in downstream-directed orientation.

2. The check valve of claim 1, in which the arcuate limits of said upstop are reduced to approximately $\pi/2$ radians at the diametrically opposite regions of upstop support by said mount structures.

3. The check valve of claim 1, in which the hinge suspension comprises a diametrically extending pin held at its ends by said mounting structures.

4. The check valve of claim 1, in which said seat post carries a flow-deflecting semicylindrical formation, the semicylindrical arc of which is upstream-directed.

5. The check valve of claim 4, in which the diametrical extent of said semicylindrical formation approximates the outer-limit span of said valve members when in contact with said upstop.

6. The check valve of claim 1, additionally including spring means normally urging said valve members to seated position.

* * * * *